J. R. EARP.
TIRE MOLD.
APPLICATION FILED FEB. 17, 1921.
1,392,487.
Patented Oct. 4, 1921.
2 SHEETS—SHEET 1.
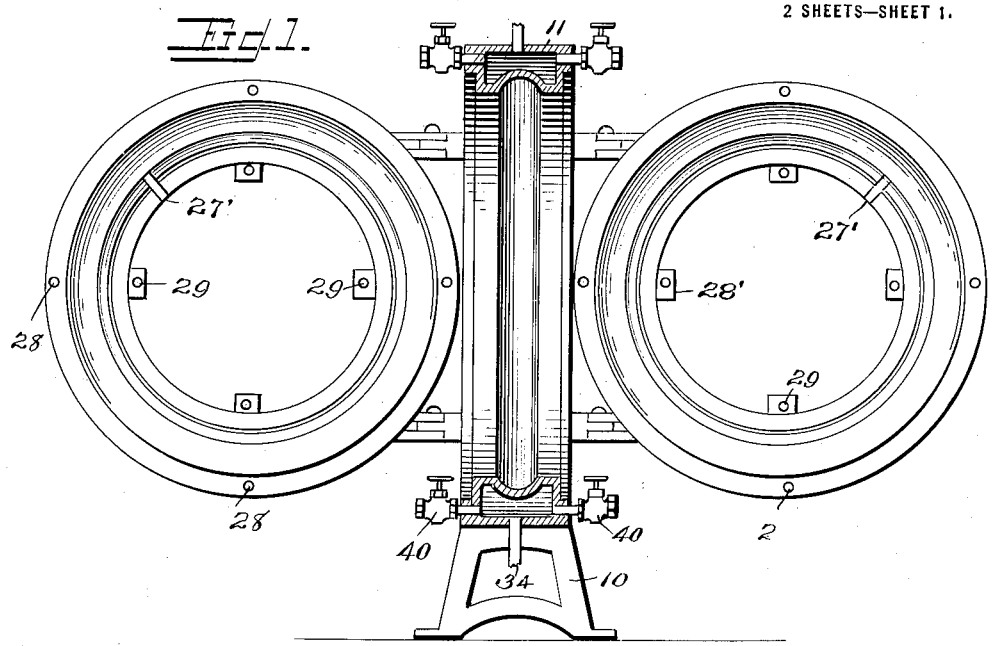
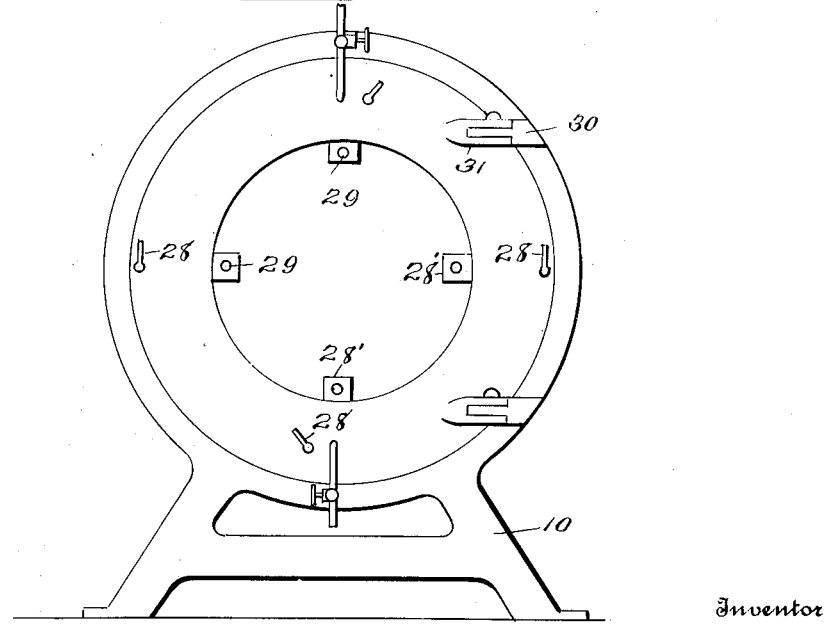
Inventor
J. Russell Earp
By
Geo. H. Snyder Attorney

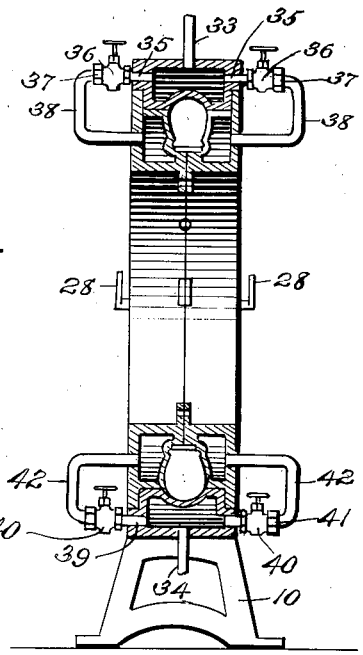
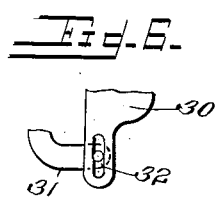
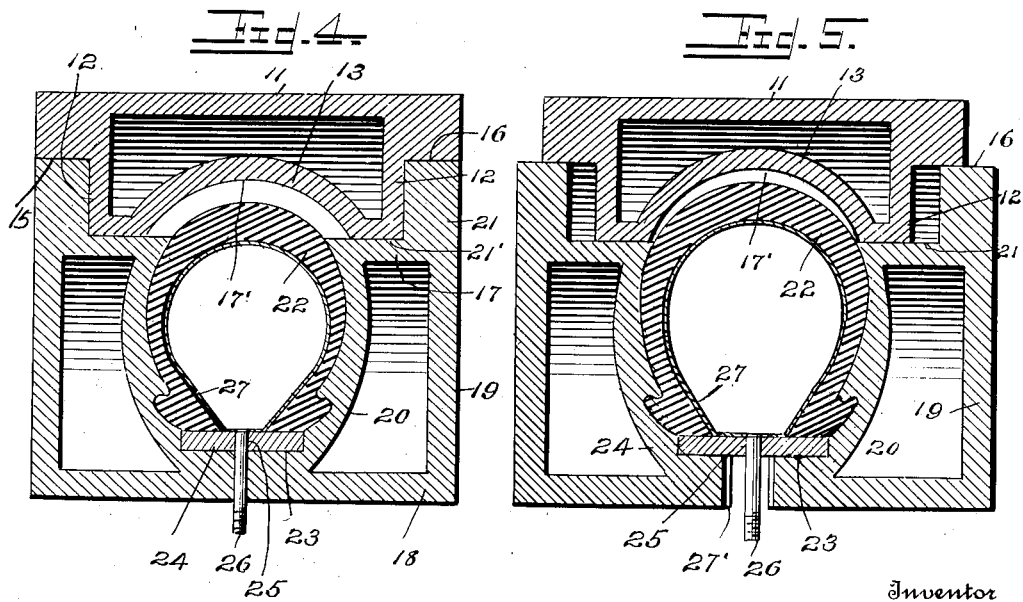

UNITED STATES PATENT OFFICE.

JHUE RUSSELL EARP, OF CHATTANOOGA, TENNESSEE.

TIRE-MOLD.

1,392,487.   Specification of Letters Patent.   Patented Oct. 4, 1921.

Application filed February 17, 1921. Serial No. 445,638.

*To all whom it may concern:*

Be it known that I, JHUE RUSSELL EARP, a citizen of the United States, residing at Chattanooga, in the county of Hamilton and State of Tennessee, have invented certain new and useful Improvements in Tire-Molds, of which the following is a specification.

This invention relates to vulcanizing apparatus and has special reference to a vulcanizer for automobile tires.

More particularly the invention relates to a retreading vulcanizer for automobile tires.

One important object of the invention is to improve and simplify the general construction of devices of this character.

In vulcanizing new treads on automobile tires it is customary, in the ordinary manner of performing this operation, to have a separate mold for each and every different size of tire.

A second important object of the invention is to provide a novel and improved arrangement of vulcanizer wherein a single mold may be utilized for the vulcanizing of several sizes of tires, the adjustment of the mold being made in a simple and improved manner.

During the operation of retreading it is frequently found that a tire which has become worn to such an extent as to require retreading has also become worn on the sides and at the bead and has likewise frequently suffered a blow out on the side.

A third object of this invention is to provide an improved form of vulcanizing apparatus wherein it is possible, when desired, simultaneously with the application of a new tread to make all necessary repairs to the sides and beads of the tire by the vulcanizing process.

A fourth important object of the invention is to provide for improved means of distributing and regulating the steam flow in a steam heated vulcanizer of this description.

With the above and other objects in view, as will be hereinafter apparent, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a vertical median section through a vulcanizer constructed in accordance with this invention, the side molds being thrown open.

Fig. 2 is a side elevation of the device with the side molds closed.

Fig. 3 is a section similar to Fig. 1 with the side molds closed.

Fig. 4 is an enlarged detail section through the molds showing one size of tire therein arranged ready for retreading.

Fig. 5 is a section similar to Fig. 4 showing an over-size tire in the mold.

Fig. 6 is a detail of one of the hinges connecting the side molds with the tread mold.

In carrying out the objects of this invention there is provided a stand 10. Carried by the stand 10 and preferably formed integrally therewith is a rim or tread mold of annular form. This tread mold is provided with an outer wall 11, side walls 12 and an inner wall 13 so that by these walls there is formed an annular steam box 14. The side walls are provided with outwardly extending ribs 15, the outer faces of these ribs being coincident with the outer face of the outer wall. The inner faces of these ribs form shoulders 16 for purposes hereinafter to be described. The inner wall 13 has its central portion arcuate in cross section to form a seat 17' for the new tread which is to be applied to the tire.

Each of the side molds is provided with an outer wall 17, an inner wall 18, an outer side wall 19 and an inner side wall 20. Extending from the outside edge of the outer wall 17 of each side mold is an annular rib or flange 21 which, when the side molds are closed on the tread mold, fits against the shoulder 16 and the inner portion of a respective side wall 12. Moreover the outer wall 17 of the side mold fits against a flat portion 21' of the inner wall 13 of the tread mold. The inside side wall 20 of each side mold is shaped to conform to the side and bead of a tire 22 as can be clearly seen by reference to Figs. 4 and 5. Moreover an annular rabbet 23 is formed in each wall 20 at its junction with the wall 18 so as to accommodate a felly plate 24 which is of annular form and is of the same diameter as the felly of the tire which is to be vulcanized. This felly plate is provided with a suitable opening 25 wherethrough extends the valve stem 26 of an inner tube 27, this inner tube being inflated in the usual manner to hold the tire 22 firmly in position in the mold. Moreover the side molds are provided with notches or recesses 27' wherethrough the valve stem 26 passes when the molds are closed. Now it will be observed from an inspection of Figs. 4 and 5 that the closure plate 24 may be of comparatively narrow width as shown in Fig. 4, when it is desired to vulcanize a tire of the smallest size receivable in the mold. From Fig. 5 it can be seen that the side molds do not have to be assembled in contact but may be spread apart and the closure plate 24 be made sufficiently wide to fill the space between the inner parts of said side molds. In order to regulate the adjustment of the side molds on the tread mold there is provided a series of spacing screws 28 which pass through the rim portions of the side mold and bear against the side walls of the tread mold. Thus by rotating these screws in one direction or the other they can be caused to project inwardly of the side molds and thereby hold these side molds at the desired distance from the tread mold. In order to hold the side molds together lugs project from the walls 18 of these molds as shown at 28' and through these lugs pass bolts 29 which are screwed up after the molds are in position to hold them tightly in place. On the tread mold are located hinge members 30 to coöperate with similar members 31 on the side molds, the two members being connected by a pin and slot connection as shown at 32 in Fig. 6 so that the side molds, while remaining hinged to the tread mold, can move in and out bodily with respect to said mold.

Leading into the tread mold is a steam pipe 33 preferably located at the top of said mold while an exhaust pipe 34 leads out of the bottom of the mold. Screwed into each side of the tread mold at the top are nipples 35 which carry valves 36. Each of these valves 36 is connected by union 37 detachably with a flexible pipe 38 communicating with the interior of a respective side mold. Similarly at the bottom of the tread mold are nipples 39 carrying valves 40 connected by unions 41 with flexible pipes 42 forming the exhaust pipes from the bottom of the side molds.

In operation if it be merely desired to vulcanize the tread or to apply a new tread to the tread of a tire the valves 36 and 40 are kept closed and parts are assembled as shown in Figs. 4 or 5 with the new tread placed in the space between the arcuate wall 17 and the old tire 22, the contacting surfaces of tread and tire having been prepared in the usual manner. Steam is then admitted through the pipe 33 and thus the tread mold is heated to the proper degree to thoroughly vulcanize the new tread on to the tire. If it be desired to vulcanize one or both sides of the tire at the same time that the tread is vulcanized one or both of the valves 36 and one or both of the valves 40 are opened after the mold has been assembled on the tire. Thus one or both of the side molds are heated and the vulcanization is properly effected.

It is to be observed that the screws 28 also have the function of enabling the side molds to be forced away from the tread mold, a function which is extremely useful in cases where the tire adheres to the mold.

From the foregoing it will be observed that the positioning of the steam inlet at the top of the mold and the steam outlet at the bottom provides for a drainage of any condensation so that at all times hot dry steam is contained in the mold. Moreover the tire, when positioned in this mold, is completely surrounded by the vulcanizer so that all parts of the tire including the rim and beads are properly vulcanized and cured.

Furthermore it is desired to call attention to the fact that with the mold constructed in accordance with the present invention a proper matrix is provided between the tire and the tread mold for holding the tread.

Another point to be observed is that the intimate contact between the side molds and the tread mold serves to heat the side molds, when steam is admitted to the tread mold, to such a degree as to render it unnecessary, in many cases, to admit steam to the side molds since the heat received from the tread mold will produce an effective cure to those parts of the tire covered by the side mold, the tire being cured all the way around from tread to bead in one operation.

There has thus been provided a simple and efficient device of the kind described and for the purpose specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a vulcanizer, a tread mold, a pair of side molds hinged to said tread mold, means to draw said side molds together, and other means to hold said side molds adjustably apart.

2. In a vulcanizer, a tread mold, a pair of side molds hinged to said tread mold, means to draw said side molds together, other means to hold said side molds adjustably apart, and a filler strip bridging the space between said side molds.

3. In a vulcanizer, a hollow tread mold, a pair of hollow side molds hinged thereto, steam inlet and exhaust pipes communicating with the tread mold, inlet nipples projecting from the tread mold and provided each with a valve and a union, outlet nipples also projecting from the tread mold and similarly provided with valves and unions, and flexible connections extending from the side molds and releasably held by said unions.

4. In a vulcanizer, a tread mold, a pair of side molds, hinges connecting the side and tread molds and having pin and slot connections between their members, adjustable spacing means carried by the side molds to regulate the space between said side molds and the tread mold, and securing means for holding the side molds against separation.

5. In a vulcanizer, a tread mold, a pair of side molds, hinges connecting the side and tread molds and having pin and slot connections between their members, adjusting screws carried by the side molds and having their ends engaged against the tread mold, opposed bolt receiving lugs on the side molds, and bolts passing through said lugs and provided with securing nuts.

6. In a vulcanizer, a hollow tread mold, a pair of hollow side molds, hinges connecting the tread mold with the side molds and having members connected by a pin and slot connection, adjustable spacing means carried by the side molds to regulate the space between said side molds, securing means for holding said side molds against separation, inlet and exhaust pipes connected to the tread mold, and flexible pipes connecting the tread mold with the side molds.

In testimony whereof I affix my signature.

J. RUSSELL EARP.